United States Patent
Taniguchi

(10) Patent No.: US 9,219,283 B2
(45) Date of Patent: Dec. 22, 2015

(54) METHOD FOR CONTROLLING FUEL CELL DEVICE DURING POWER GENERATION START BY CONTROLLING POWER CONDITIONER

(75) Inventor: Eiji Taniguchi, Higashiomi (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 588 days.

(21) Appl. No.: 13/265,827

(22) PCT Filed: Mar. 24, 2010

(86) PCT No.: PCT/JP2010/055021
§ 371 (c)(1),
(2), (4) Date: Oct. 21, 2011

(87) PCT Pub. No.: WO2010/122868
PCT Pub. Date: Oct. 28, 2010

(65) Prior Publication Data
US 2012/0040263 A1 Feb. 16, 2012

(30) Foreign Application Priority Data

Apr. 24, 2009 (JP) .................. 2009-105950

(51) Int. Cl.
*H01M 8/04* (2006.01)
*H01M 8/06* (2006.01)
(Continued)

(52) U.S. Cl.
CPC ........ *H01M 8/04022* (2013.01); *H01M 8/0432* (2013.01); *H01M 8/0488* (2013.01);
(Continued)

(58) Field of Classification Search
CPC .......... H01M 8/04022; H01M 8/0432; H01M 8/0488; H01M 8/0491; H01M 8/04268
USPC .......................... 429/432, 423, 425, 429, 433
See application file for complete search history.

(56) References Cited

U.S. PATENT DOCUMENTS

| | | | |
|---|---|---|---|
| 6,974,646 B2 * | 12/2005 | Noetzel et al. ................. | 429/425 |
| 2005/0136296 A1 * | 6/2005 | Skidmore et al. ............... | 429/13 |

(Continued)

FOREIGN PATENT DOCUMENTS

| | | |
|---|---|---|
| CN | 1832872 A | 9/2006 |
| CN | 101199067 A | 6/2008 |

(Continued)

OTHER PUBLICATIONS

Taniguchi, E., Machine translation of JP 2008-159467 A, Jul. 2008.*

(Continued)

*Primary Examiner* — Sean P Cullen
(74) *Attorney, Agent, or Firm* — Volpe and Koenig, P.C.

(57) ABSTRACT

Provided is a fuel cell module and a fuel cell device of which power generation efficiency is improved.

A fuel cell device includes a fuel cell module including a housing and a fuel cell stack which is composed of a plurality of fuel cells and is inside the housing, a power conditioner configured to supply electric current generated by the fuel cell stack to an external load, and a controller configured to control the power conditioner such that, at a time of starting power generation, a voltage value of the fuel cells is greater than a voltage value for generating a maximum output in power generation of the fuel cells, and the fuel cell module, the power conditioner and the controller are accommodated in an external case. Accordingly, deterioration of the fuel cells can be suppressed, and the fuel cell device having improved reliability can be obtained.

10 Claims, 3 Drawing Sheets

(51) Int. Cl.
    *H01M 8/24*     (2006.01)
    *H01M 8/12*     (2006.01)

(52) U.S. Cl.
    CPC ........ H01M8/0491 (2013.01); H01M 8/04268 (2013.01); *H01M 8/04373* (2013.01); *H01M 8/2475* (2013.01); *H01M 2008/1293* (2013.01); *Y02E 60/50* (2013.01); *Y02E 60/525* (2013.01)

(56) References Cited

U.S. PATENT DOCUMENTS

| | | | |
|---|---|---|---|
| 2006/0234092 A1 | 10/2006 | Thompson et al. | |
| 2006/0257698 A1 | 11/2006 | Ishikawa et al. | |
| 2007/0207356 A1* | 9/2007 | Miyata et al. | 429/26 |
| 2007/0281115 A1 | 12/2007 | Shigehisa | |
| 2007/0292724 A1* | 12/2007 | Gilchrist | 429/9 |
| 2009/0291335 A1 | 11/2009 | Anzai | |
| 2010/0167154 A1 | 7/2010 | Ono | 429/457 |
| 2010/0310951 A1 | 12/2010 | Hatada | |
| 2014/0106250 A1 | 4/2014 | Hatada | |

FOREIGN PATENT DOCUMENTS

| | | | |
|---|---|---|---|
| EP | 1986263 A1 | | 10/2008 |
| JP | 06-150952 | | 5/1994 |
| JP | 2001-229944 | | 8/2001 |
| JP | 2003323909 A | | 11/2003 |
| JP | 2004-022193 | | 1/2004 |
| JP | 2004-288562 | | 10/2004 |
| JP | 2005285433 A | | 10/2005 |
| JP | 2006-032262 | | 2/2006 |
| JP | 2006190605 A | | 7/2006 |
| JP | 2007-042566 | | 2/2007 |
| JP | 2007-059377 | | 3/2007 |
| JP | 2008159467 A | * | 7/2008 |
| JP | 2008243594 A | * | 10/2008 |
| JP | 2009051712 A | | 3/2009 |
| JP | 2009-151986 | | 7/2009 |
| JP | 2009205996 A | | 9/2009 |
| WO | 2006009264 A1 | | 1/2006 |

OTHER PUBLICATIONS

Taniguchi, E., Machine translation of JP 2008-243594 A, Oct. 2008.*
Kuromame, T., Machine translation of JP 2004-022193 A, Dec. 2004.*
Chinese language office action dated Aug. 21, 2013 and its English language Concise Explanation issued in corresponding Chinese application 201080017725.1.
Japanese language office action dated Dec. 3, 2013 and its English language Statement of Relevance of Non-English References pursuant to 37 CFR 1.98(a)(3)(i).
Korean language office action dated May 26, 2014 and its English language Statement of Relevance of Non-English References Pursuant to 37 CFR 1.98(a)(3)(i) issued in corresponding Korean application 1020117027359.
Extended European Search Report, European Patent Application No. 10766927.7, Oct. 20, 2014, 8 pp.

* cited by examiner

METHOD FOR CONTROLLING FUEL CELL DEVICE DURING POWER GENERATION START BY CONTROLLING POWER CONDITIONER

CROSS-REFERENCE TO THE RELATED APPLICATIONS

This application is a national stage of international application No. PCT/JP2010/055021, filed on Mar. 24, 2010, and claims the benefit of priority under 35 USC 119 to Japanese Patent Application No. 2009-105950, filed on Apr. 24, 2009, the entire contents of which are incorporated herein by reference.

TECHNICAL FIELD

The present invention relates to a fuel cell device containing inside an exterior case a fuel cell module containing inside a housing a fuel cell stack in which a plurality of fuel cells are arranged.

BACKGROUND ART

Recently, as next-generation energy, various fuel cell modules and fuel cell devices that contain such fuel cell modules inside exterior cases have been proposed. In such fuel cell modules, a plurality of fuel cells that can generate power using hydrogen-containing gas (fuel gas) and air (oxygen-containing gas) are arranged with a current collector being disposed therebetween and are electrically connected to form a cell stack, and such a cell stack is fixed to a manifold for supplying fuel gas to the fuel cells, thus constituting a cell stack device, and such a cell stack device is housed inside a housing (see, for example, Patent Literature 1).

In such a fuel cell device, to supply the required power that is required by a load, the flow rate of the fuel gas supplied to the fuel cells, the voltage of the fuel cells, and the like are suitably adjusted.

CITATION LIST

Patent Literature

Patent Literature 1: Japanese Unexamined Patent Publication JP-A 2007-59377

SUMMARY OF INVENTION

Technical Problem

Meanwhile, the fuel cell module (inside the housing) is in a low-temperature state when a fuel cell device (fuel cells) starts power generation or when a low load continues for a long period of time, for example, during late-night hours.

When a high load is required under the conditions mentioned above, it is necessary due to the high load to draw large electric current from the fuel cells, and consequently the voltage of the fuel cells decreases, and the electric current increases. In this case, an increase in electric current while the fuel cell temperature is low results in non-uniform electric current in the fuel cells, and concentration of electric current on some of the fuel cells is likely to deteriorate the fuel cells. In particular, in the case where the maximum output is needed in response to the requirement by an external load, the fuel cells are likely to deteriorate.

Therefore, an object of the invention is to provide a fuel cell device that can generate power that meets the required load, while suppressing fuel cell deterioration, at the time the fuel cell device starts power generation or when low-load conditions such as late-night hours continue for a long period of time.

Solution to Problem

A fuel cell device of the invention includes a fuel cell module including a housing and a fuel cell stack which is composed of a plurality of fuel cells and is inside the housing; a power conditioner configured to supply electric current generated by the fuel cell stack to an external load; and a controller configured to control the power conditioner such that, at a time the fuel cell device starts power generation, a voltage value of the fuel cells is greater than a voltage value for generating a maximum output in power generation of the fuel cells, wherein the fuel cell module, the power conditioner and the controller are accommodated in an exterior case.

In such a fuel cell device, the controller controls the power conditioner such that, at the time the fuel cell device (fuel cells) starts power generation, the voltage value of the fuel cells is greater than the voltage value for generating the maximum output in power generation of the fuel cells, and therefore the amount of electric current generated by power generation of the fuel cell stack (fuel cells) is reduced, thus enabling the amount of electric current flowing in the fuel cells to be reduced. Thereby, a non-uniform flow of electric current in the fuel cells can be suppressed, and fuel cell deterioration can be suppressed.

A fuel cell device of the invention includes a fuel cell module including a housing, a fuel cell stack which is composed of a plurality of fuel cells and is inside the housing, and a temperature sensor configured to measure a temperature inside the housing; a power conditioner configured to supply electric current generated by the fuel cell stack to an external load; and a controller that controls the power conditioner such that, when the temperature inside the housing measured by the temperature sensor is less than a specific temperature, a voltage value of the fuel cells is greater than a voltage value for generating a maximum output in power generation of the fuel cells, wherein the fuel cell module, the power conditioner and the controller are accommodated in an exterior case.

In such a fuel cell device, the controller controls the power conditioner such that, when the temperature inside the housing (fuel cell module) is less than a specific temperature, the voltage value of the fuel cells is greater than the voltage value for generating the maximum output in power generation of the fuel cells, and therefore the amount of electric current generated by power generation of the fuel cell stack (fuel cells) is reduced, thus enabling the amount of electric current flowing in the fuel cells to be reduced. Thereby, a non-uniform flow of electric current in the fuel cells can be suppressed, and fuel cell deterioration can be suppressed.

Moreover, it is preferable that the fuel cell device of the invention includes a reformer comprising a reforming catalyst which is configured to reform raw fuel and generate fuel gas that is supplied to the fuel cells, and raw fuel supplying means configured to supply raw fuel to the reformer, excessive fuel gas which has not been used for power generation of the fuel cells is burnt, and the controller controls the raw fuel supplying means such that a first minimum flow rate value of the fuel gas supplied to the fuel cells during a time the power conditioner is controlled such that the voltage value of the fuel cells is greater than the voltage value for generating the maximum output in power generation of the fuel cells, is greater than a second minimum flow rate value of the fuel gas supplied to the fuel cells during a time the power conditioner is not controlled such that the voltage value of the fuel cells is greater than the voltage value for generating the maximum output in power generation of the fuel cells.

In such a fuel cell device, the power conditioner is controlled such that the first minimum flow rate value of the fuel gas supplied to the fuel cells during the time the voltage value of the fuel cells is controlled so as to be greater than the voltage for generating the maximum output in power generation of the fuel cells is greater than the second minimum flow rate value of the fuel gas supplied to the fuel cells during the time no such control is performed, and thereby the amount of excessive fuel gas which has not been used for power generation of the fuel cell is increased. Thereby, the calorific value of heat of combustion generated by burning excessive fuel gas is increased, thus enabling the temperature inside the fuel cell module to be increased rapidly.

Moreover, it is preferable that the fuel cell device of the invention includes a reformer comprising a reforming catalyst which is configured to reform raw fuel and generate fuel gas that is supplied to the fuel cells, and raw fuel supplying means configured to supply raw fuel to the reformer, excessive fuel gas which has not been used for power generation of the fuel cells is burnt, and the controller controls the raw fuel supplying means such that a first amount of fuel gas supplied to the fuel cells during a time the power conditioner is controlled such that the voltage value of the fuel cells is greater than the voltage value for generating the maximum output in power generation of the fuel cells, is greater than a second amount of fuel gas supplied to the fuel cells during a time the power conditioner is not controlled such that the voltage value of the fuel cells is greater than the voltage value for generating the maximum output in power generation of the fuel cells.

In such a fuel cell device, the amount of the fuel gas supplied to the fuel cells during the time the power conditioner is controlled such that the voltage value of the fuel cells is greater than the voltage for generating the maximum output in power generation of the fuel cells is greater than that during the time no such control is performed, and thereby the amount of excessive fuel gas which has not been used for power generation of the fuel cell is increased. Thereby, the calorific value of heat of combustion generated by burning excessive fuel gas is increased, thus enabling the temperature inside the fuel cell module to be increased rapidly.

Moreover, it is preferable that in the fuel cell device of the invention, the controller controls the power conditioner such that, after a specific period of time since the voltage value of the fuel cells is controlled so as to be greater than the voltage value for generating the maximum output in power generation of the fuel cells, the voltage value of the fuel cells reaches the voltage value for generating the maximum output in power generation of the fuel cells.

After a specific period of time since the voltage value of the fuel cells is controlled so as to be greater than the voltage value for generating the maximum output in power generation of the fuel cells, even when the temperature inside the fuel cell module (housing) is not sufficiently increased, the temperature of each fuel cell is nearly uniform or uniform.

Because the temperature of each fuel cell is nearly uniform, concentration of electric current on some of the fuel cells and creation of a portion having high electric resistance in a low-temperature fuel cell when the voltage value of the fuel cells is the voltage value for generating the maximum output in power generation of the fuel cells can be suppressed, thus enabling fuel cell deterioration to be suppressed.

Therefore, in such a case, controlling the power conditioner by the controller such that the voltage value of the fuel cells reaches the voltage value for generating the maximum output in power generation of the fuel cells enables the output of the fuel cells to be increased to their fullest extent.

Moreover, it is preferable that the fuel cell device of the invention includes a temperature sensor configured to measure a temperature inside the housing, and the controller controls the power conditioner such that, when the temperature inside the housing measured by the temperature sensor is at or higher than a specific temperature, the voltage value of the fuel cells reaches the voltage value for generating the maximum output in power generation of the fuel cells.

When the temperature inside the housing (fuel cell module) is at or higher than a specific temperature, the temperature of the fuel cell is also increased. In such a case, it is preferable to bring the voltage value of the fuel cells to a voltage value that can generate the maximum output.

Therefore, when the temperature inside the fuel cell module measured by the temperature sensor is at or higher than a specific temperature, controlling the power conditioner by the controller such that the voltage value of the fuel cells reaches the voltage value for generating the maximum output in power generation of the fuel cells enables the output of the fuel cells to be increased to their fullest extent.

Moreover, it is preferable that in the fuel cell device of the invention, the controller controls the power conditioner such that, when the temperature inside the housing measured by the temperature sensor is at or higher than a specific temperature, the voltage value of the fuel cells reaches the voltage value for generating the maximum output in power generation of the fuel cells.

In such a fuel cell device also, as described above, when the temperature inside the fuel cell module measured by the temperature sensor is at or higher than a specific temperature, controlling the power conditioner by the controller such that the voltage value of the fuel cells reaches the voltage value for generating the maximum output in power generation of the fuel cells enables the output of the fuel cells to be increased to their fullest extent.

Moreover, it is preferable that in the fuel cell device of the invention, the fuel cell module includes, inside the housing, a reformer comprising a reforming catalyst configured to generate fuel gas that is supplied to the fuel cells, and a reformer temperature sensor configured to measure a temperature of the reformer, the reformer is heated by heat of combustion generated by burning excessive fuel gas which has not been used for power generation of the fuel cells, and the controller controls the power conditioner such that, when the temperature of the reformer measured by the reformer temperature sensor is at or higher than a specific temperature, the voltage value of the fuel cells reaches the voltage value for generating the maximum output in power generation of the fuel cells.

In the fuel cell device including, inside a housing, a reformer comprising a reforming catalyst configured to generate fuel gas that is supplied to fuel cells, the reformer being heated by heat of combustion generated by burning excessive fuel gas which has not been used for power generation of the fuel cells, the reforming catalyst is likely to deteriorate when the temperature of the reformer is at or higher than a specific temperature.

Therefore, in such case, controlling the power conditioner by the controller such that the voltage value of the fuel cells reaches the voltage value for generating the maximum output in power generation of the fuel cells enables the output of the fuel cells to be increased to their fullest extent and the amount of excessive fuel gas to be reduced, thus enabling an increase in the reformer temperature to be suppressed and reforming catalyst deterioration to be suppressed.

Advantageous Effects of Invention

The fuel cell device of the invention includes a fuel cell module including a housing and a fuel cell stack which is composed of a plurality of fuel cells and is inside the housing; a power conditioner configured to supply electric current generated by the fuel cell stack to an external load; and a controller configured to control the power conditioner such that, at a time the fuel cell device starts power generation, a voltage value of the fuel cells is greater than the voltage value for generating a maximum output in power generation of the fuel cells, and the fuel cell module, the power conditioner and the controller are accommodated in an exterior case, and thus the amount of electric current flowing in the fuel cells can be reduced, thereby enabling a non-uniform flow of electric current in the fuel cells to be suppressed and fuel cell deterioration to be suppressed. Moreover, in a fuel cell device including a temperature sensor configured to measure the temperature inside the housing, the power conditioner is controlled such that, when the temperature inside the housing (fuel cell module) measured by the temperature sensor is less than a specific temperature, the voltage value of the fuel cells is greater than the voltage value for generating the maximum output in power generation of the fuel cells, thus enabling fuel cell deterioration to be suppressed.

DESCRIPTION OF EMBODIMENTS

Figure 1:
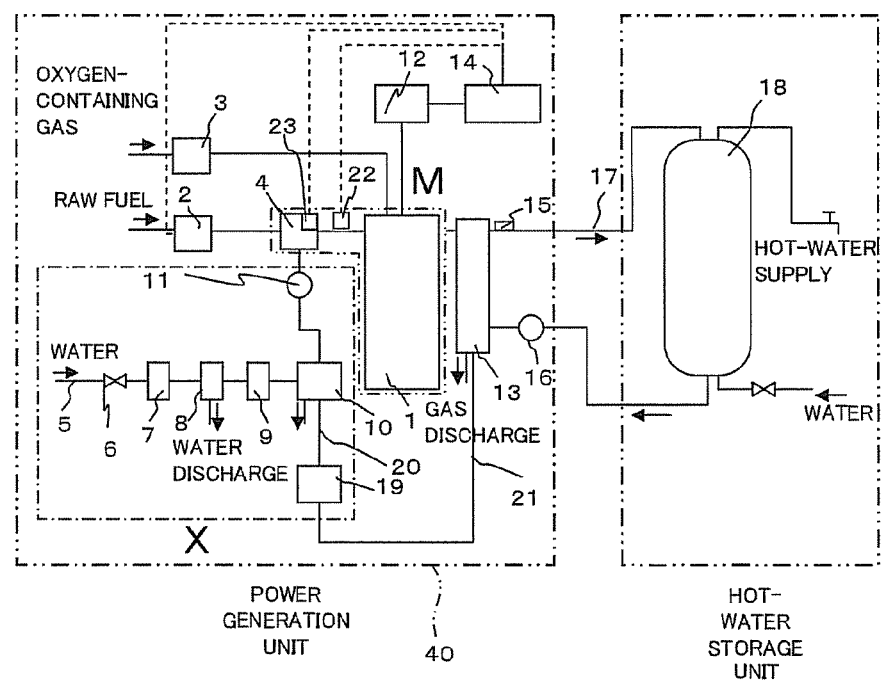
FIG. 1 is a configuration diagram showing an example of the configuration of a fuel cell system including a fuel cell device of the invention.

FIG. 1 is a configuration diagram showing an example of the configuration of a fuel cell system including a fuel cell device of the invention. In the figures mentioned hereinafter, the same number is given to the same member.

The fuel cell system shown in FIG. 1 includes an power generation unit configured to generate power, a hot-water storage unit configured to store hot and cold water after heat exchange, and circulation pipes configured to circulate water between these units, and the power generation unit corresponds to the fuel cell device of the invention.

The fuel cell device (power generation unit) shown in FIG. 1 includes a fuel cell stack 1 that is composed of a plurality of fuel cells (not shown) (hereinafter sometimes simply referred to as a cell stack), raw fuel supplying means 2 configured to supply raw fuel such as natural gas or kerosene, oxygen-containing gas supplying means 3 configured to supply oxygen-containing gas to the fuel cells constituting the cell stack 1, and a reformer 4 configured to perform steam reforming with raw fuel and water vapor. The reformer 4 includes an evaporating portion configured to evaporate pure water supplied by a water pump 11, which will be described below, and mixing raw fuel supplied from the raw fuel supplying means 2 and water vapor; a reforming portion comprising a reforming catalyst thereinside which is configured to generate fuel gas (hydrogen-containing gas) by reacting the mixed raw fuel and water vapor; and a reformer temperature sensor 23 configured to measure the temperature inside the reformer 4.

Moreover, the fuel cell device (power generation unit) shown in FIG. 1 includes a heat exchanger 13 configured to perform heat exchange between water and discharge gas (discharge heat) generated by power generation of the fuel cells constituting the cell stack 1 (hereinafter sometimes simply referred to as fuel cells), a condensed water processor 19 configured to process condensed water generated by heat exchange, and a condensed water supply pipe 21 configured to supply condensed water generated in the heat exchanger 13 to the condensed water processor 19. After being stored in a water tank 10, condensed water processed by the condensed water processor 19 is supplied to the reformer 4 (evaporating portion, not shown) by the water pump 11.

Meanwhile, when the amount of condensed water supplied to the condensed water processor 19 is small, or when the purity of condensed water after processing by the condensed water processing means is low, externally supplied water (for example, tap water) may be processed into pure water and supplied to the reformer 4. In FIG. 1, various external-water processors are provided as means configured to process externally supplied water into pure water.

Here, among the various external-water processors configured to supply externally supplied water to the reformer 4, such as an activated-carbon filter device 7 configured to clarify water, a reverse osmosis membrane device 8, and an ion exchange resin device 9 configured to process clarified water into pure water, at least the ion exchange resin device 9 (preferably all the devices) is included. Pure water generated in the ion exchange resin device 9 is stored in the water tank 10. In the fuel cell device (power generation unit) shown in FIG. 1, a feed-water valve 6 configured to regulate the amount of externally supplied water is provided. Moreover, the condensed water processor 19 and the water tank 10 are connected via a tank connecting pipe 20. In the case where only condensed water is supplied to the reformer 4, the condensed water processor 19 and the reformer 4 may be connected via the water pump 11. The term "water processor" as used herein refers to the aforementioned condensed water processor 19 and various external-water processors for processing water supplied externally, collectively, and in the fuel cell system shown in FIG. 1, a configuration including all of the aforementioned water processors is indicated.

The external water processors and the condensed water processor 19 configured to process water to be supplied to the reformer 4 into pure water (the water processors as referred to herein) are enclosed with a dashed-dotted line (what is indicated as a water supplying apparatus X encompasses a feed-water pipe 5 configured to connect the reformer 4 and the water processors, the tank connecting pipe 20, and the condensed water supply pipe 21).

In the fuel cell device of the invention, in the case where water (pure water) required in the steam reforming reaction in the reformer 4 can be sufficiently supplied solely by condensed water generated by heat exchange between water and discharge gas (discharge heat) generated by power generation of the fuel cells, it is not necessary to provide a configuration to supply water externally. Moreover, in the case where the purity of condensed water generated by the heat exchanger 13 is high, a configuration in which the condensed water processor 19 is not provided can be selected.

Moreover, the fuel cell device shown in FIG. 1 includes a power conditioner 12 configured to convert direct-current power generated in the fuel cells into alternating-current power and supply it to an external load, an outlet water temperature sensor 15 that is provided at the outlet of the heat exchanger 13 and that is for measuring the temperature of water (circulating water flow) that flows through the outlet of heat exchanger 13, and a controller 14, and together with a circulating pump 16, the power generation unit is constituted. The controller 14 will be described in detailed below. Housing these devices constituting the power generation unit inside an exterior case 40 enables a fuel cell device to be attained that is easy to install, carry, and the like. Also, a raw fuel humidifier (not shown) for humidifying raw fuel may be provided between the raw fuel supplying means 2 and the reformer 4. The hot-water storage unit includes a hot-water storage tank 18 configured to store hot and cold water after heat exchange.

Moreover, a discharge gas processor (not shown) configured to process discharge gas generated as the fuel cells operate is provided between the cell stack 1 and the heat exchanger 13. The fuel gas processor can be configured so as to contain a generally known combustion catalyst inside the housing.

The arrows in the figure indicate flow directions of raw fuel, oxygen-containing gas, and water, and dashed lines indicate main paths of signals sent to the controller 14, or main paths of signals sent from (emitted from) the controller 14. The same numeral is given to the same component, and this also applies hereinbelow.

Here, a method for operating the fuel cell device (power generation unit) shown in FIG. 1 will now be described. In performing steam reforming to generate fuel gas for use in power generation of the fuel cells, pure water used in the reformer 4 mainly is condensed water generated by heat exchange between discharge gas generated in the heat exchanger 13 as the fuel cells operate and water flowing through the circulation pipe 17. Condensed water generated in the heat exchanger 13 flows through the condensed water supply pipe 21 and is supplied to the condensed water processor 19. Condensed water (pure water) processed in the condensed water processing means (ion exchange resin or the like) provided in the condensed water processor 19 is supplied to the water tank 10 via the tank connecting pipe 20. Water stored in the water tank 10 is supplied to the reformer 4 by the water pump 11, steam reforming is performed together with raw fuel supplied from the raw fuel supplying means 2, and the generated fuel gas is supplied to the fuel cells. In the fuel cells, fuel gas and oxygen-containing gas supplied from the oxygen-containing gas supplying means 3 are used to generate power. According to the foregoing method, condensed water is effectively used, thus enabling a water self-sustaining operation to be performed.

Meanwhile, when the amount of condensed water generated is small, or when the purity of condensed water processed in the condensed water processor 19 is low, it is also possible to use externally supplied water (for example, tap water).

In this case, first, the feed-water valve 6 (for example, an electromagnetic valve, an air-driven valve, or the like) is opened, and externally supplied water such as tap water is supplied to the activated-carbon filter 7 through the feed-water pipe 5. The water processed by the activated-carbon filter 7 is subsequently supplied to the reverse osmosis membrane 8. The water processed by the reverse osmosis membrane 8 is subsequently supplied to the ion exchange resin device 9, and the pure water generated by processing by the ion exchange resin device 9 is stored in the water tank 10. The pure water stored in the water tank 10 is used for power generation of the fuel cells according to the above-described method.

In the fuel cell device (power generation unit), while fuel gas is supplied to the fuel cells constituting the cell stack 1 via the reformer 4 as the fuel cell device operates, oxygen-containing gas is supplied from the oxygen-containing gas supplying means 3.

In FIG. 1, the fuel cell module constituting the fuel cell device of the invention is configured so as to house the cell stack 1 and the reformer 4 inside the housing. In FIG. 1, the devices constituting the fuel cell module are enclosed by a dashed double-dotted line. Inside the fuel cell module M, a temperature sensor 22 for measuring the temperature inside the fuel cell module M is provided.

Power is generated in the cell stack 1 (fuel cells) using fuel gas supplied via the reformer 4 and oxygen-containing gas supplied from the oxygen-containing gas supplying means 3, and the electric current generated in the fuel cells is supplied to an external load via the power conditioner 12. This flow of electric current and control therefor will be described below.

Figure 2:
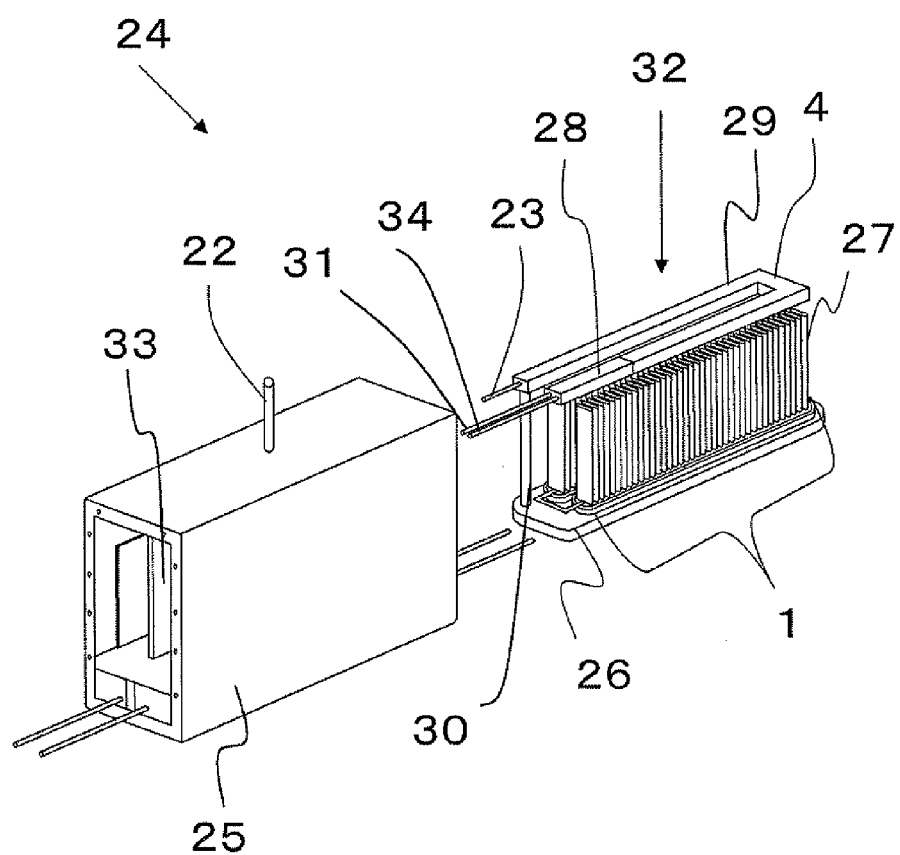
FIG. 2 is an external perspective view showing an example of a fuel cell module constituting the fuel cell device of the invention.

Next, the fuel cell module constituting the fuel cell device of the invention will now be described (hereinafter sometimes simply referred to as a module). FIG. 2 is an external perspective view showing an example of the module 24 constituting the fuel cell device of the invention.

The module 24 shown in FIG. 2 is configured to accommodate a cell stack device 32 inside the housing 25. The cell stack 1 is configured such that columnar fuel cells 27 having a gas passage (not shown) inside of which fuel gas travels are vertically disposed and are electrically connected with each other in series with a current collector (not shown) being disposed between adjacent fuel cells 27, and the lower end of each fuel cell 27 constituting the cell stack 1 is fixed to a manifold 26 by an insulating binder (not shown) such as a glass sealant, thus forming the cell stack device 32. In addition, a conductive member having a current-drawing portion (not shown) to collect and draw out the electric current generated by power generation of the cell stack 1 (fuel cells) is disposed at both ends of the cell stack 1.

In FIG. 2, as a fuel cell 27, a solid-oxide fuel cell is shown as an example that is hollow and flat plate-shaped and has a gas passage inside of which fuel gas (hydrogen-containing gas) travels in a longitudinal direction, and on the surface of a support having the gas passage, a fuel-side electrode layer, a solid electrolyte layer, and an oxygen-side electrode layer are stacked in this order.

Furthermore, in FIG. 2, the reformer 4 for reforming raw fuel such as natural gas (raw fuel) supplied via the raw fuel supply pipe 31 and for generating fuel gas is disposed above the cell stack 1 (fuel cells 27) to obtain fuel gas for use in power generation of the fuel cells 27. Here, it is preferable that the reformer 4 has a structure that allows steam reforming, which is an efficient reforming reaction, to be performed, and the reformer 4 includes an evaporating portion 28 configured to evaporate water, and a reforming portion 29 in which a reforming catalyst (not shown) which is configured to reform raw fuel into fuel gas is disposed. While a feed-water pipe 34 configured to supply pure water to the evaporating portion 28 is connected thereto, and the feed-water pipe 34 and the raw fuel supply pipe 31 are provided separately, it is possible to provide the raw fuel supply pipe 31 and the feed-water pipe 34 as a double pipe. The reformer temperature sensor 23 configured to measure the temperature inside the reformer 4 is disposed in the reformer 4. Depending on the purpose, the reformer temperature sensor 23 may be suitably disposed such that the temperature inside the evaporating portion 28 or the reforming portion 29 is measured, and a plurality of such sensors may be disposed.

Fuel gas generated by the reformer 4 is supplied to the manifold 26 via a fuel gas flow pipe 30, and then supplied to the gas passage provided inside the fuel cells 27 from the manifold 26.

In FIG. 2, a part (front and rear surfaces) of the housing 25 is removed, and the cell stack device 32 to be housed inside is taken out to the rear. Here, in the module 24 shown in FIG. 2, the cell stack device 32 can be housed inside the housing 25 by sliding the device into the housing.

Inside the housing 25, an oxygen-containing gas introducing member 33 is disposed between rows of the cell stack 1 arranged in parallel on the manifold 26 such that oxygen-containing gas (oxygen-containing gas) flows from the lower end toward the upper end along a side of the fuel cells 27 via inside of the current collector. Moreover, in the housing 25, the temperature sensor 22 for measuring the temperature inside the housing 25 (inside the module 24) is disposed. The temperature sensor 22 shown in FIG. 2 shows an example in which the sensor is disposed by being inserted into the housing 25 from above the housing 25. Here, it is sufficient that the temperature sensor 22 can measure the temperature inside the housing 25, but it is preferable to dispose the temperature sensor 22 such that a temperature sensing portion of the temperature sensor 22 is disposed at the center along an arrangement direction of the fuel cells 27 of the cell stack 1 where the temperature is higher.

Burning excessive fuel gas discharged from the gas passage of the fuel cells 27 and oxygen-containing gas on the upper end side of the fuel cells 27 can increase the temperature of the fuel cells 27 and thus can accelerate the start-up of the cell stack 1. In addition, that can warm the reformer 4 disposed above the fuel cells 27 (cell stack 1), thus enabling a reforming reaction to be performed efficiently with the reformer 4.

Figure 3:
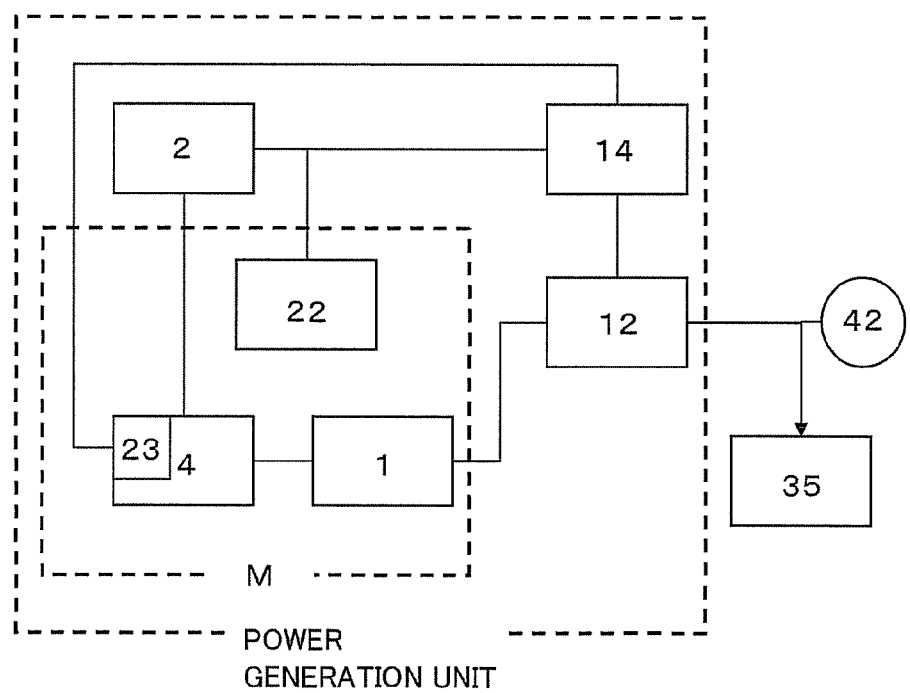
FIG. 3 is an explanatory drawing that describes a supply of electric current generated by a fuel cell stack constituting the fuel cell device of the invention, to an external load.

FIG. 3 is an explanatory drawing that shows a portion of the fuel cell device shown in FIG. 1 and that describes a supply of electric current generated by the cell stack 1 (fuel cells 27) to an external load 35.

The direct-current power generated in the cell stack 1 is converted into alternating-current power by the power conditioner 12, combined with the power supplied from a system power supply 42, and supplied to the external load 35. Therefore, the power conditioner 12 has a function of not only supplying the power generated by the cell stack 1 to the external load 35, but also controlling the electric energy on the fuel cell device side supplied to the external load 35.

Therefore, since the power conditioner 12 controls the electric energy supplied from the cell stack 1 to the external load 35, the power conditioner 12 has a function of controlling the amount of electric current associated with power generation of the cell stack 1 and the voltage value of the cell stack 1.

Meanwhile, at the time the fuel cell device (cell stack 1) starts power generation or when a low load continues for a long period of time, for example, during late-night hours, the temperature inside the housing 25 (module 24) is in a low-temperature state.

In this case, if a high load is required by the exterior load 35, large electric current is drawn from the fuel cells 27 due to the high load, and thus the amount of electric current from the fuel cells 27 (cell stack 1) is increased, and the voltage of the fuel cells 27 is decreased.

Accordingly, an increase in electric current while the temperature of the fuel cells 27 is low results in non-uniform electric current in the fuel cells 27, and concentration of electric current on some of the fuel cells 27 is likely to deteriorate the fuel cells 27. In addition, in low-temperature fuel cells 27, the electric resistance is higher than that in high-temperature fuel cells 27, and it is also likely that portions having high electric resistance deteriorate locally. In particular, in the case where the maximum output is needed in response to the requirement by the external load, the fuel cells 27 are likely to deteriorate.

Regarding the maximum output of the fuel cells 27, since the DC output of the fuel cells 27 (cell stack 1) is W=I×V, the voltage of the fuel cells 27 is half the open circuit voltage (abbreviated as OCV), i.e., ½ OCV (hereinafter, the voltage value for obtaining the maximum output is sometimes referred to as ½ OCV). That is, for example, when the OCV of the fuel cells 27 is 1 V, the voltage for the fuel cells 27 to attain the maximum output (½ OCV) is 0.5 V.

Therefore, in the fuel cell device of the invention, the controller 14 controls the power conditioner 12 such that, at the time the fuel cell device (fuel cells 27) starts power generation, the voltage value of the fuel cells 27 is greater than the voltage value for generating the maximum output in power generation of the fuel cells 27 (½ OCV). Thereby, the amount of electric current supplied to the external load 35 from the fuel cells 27 can be reduced, enabling deterioration of the fuel cells 27 to be suppressed. Here, regarding the phrase "the voltage value of the fuel cells 27 is greater than the voltage value for generating the maximum output in power generation of the fuel cells 27 (½ OCV)", it is preferable that the voltage value is set such that even when the voltage value of the fuel cells 27 fluctuates, the minimum voltage value is greater than the voltage value for generating the maximum output in power generation of the fuel cells 27 (½ OCV). This also applies to the description provided below.

The voltage value of the fuel cells 27 may be obtained by, in addition to measuring the voltage value of each fuel cell 27, dividing the total voltage of the cell stack 1 by the number of the fuel cells 27 constituting the cell stack 1.

In the fuel cell device in which the temperature sensor 22 is disposed inside the housing 25 (module 24), the controller 14 controls the power conditioner 12 such that, when the temperature inside the housing 25 (inside the module 24) measured by the temperature sensor 22 is less than a specific temperature, the voltage value of the fuel cells 27 is greater than the voltage value for generating the maximum output in power generation of the fuel cells 27 (½ OCV).

That is, when the temperature inside the housing 25 measured by the temperature sensor 22 is less than a specific temperature, the voltage value of the fuel cells 27 is set so as to be a value greater than ½ OCV, and thus the amount of electric current supplied to the external load 35 from the fuel cells 27 is reduced. Thereby, the amount of electric current flowing in the fuel cells 27 can be reduced, enabling deterioration of the fuel cells 27 to be suppressed.

The specific temperature inside the housing 25 can be suitably set according to the size of the housing 25, the output of the cell stack 1 (fuel cell device), and other factors, and for example, when the output of the fuel cell device is 700 W and the volume of the housing 25 is about 27 L, the temperature may be set so as to be between 650° C. and 700° C. In this case, regarding the phrase "the voltage value of the fuel cells 27 is controlled so as to be greater than the voltage value for generating the maximum output in power generation of the fuel cells 27 (½ OCV)", the voltage value is suitably set so as to be between 0.6 V and 0.8 V when OCV is 1 V.

Meanwhile, for efficiently operating the fuel cell device, the shorter the duration of controlling the voltage value of the fuel cells 27 so as to be greater than the voltage value for generating the maximum output in power generation of the fuel cells 27 (½ OCV) by controlling the power conditioner 12, the more favorable.

Therefore, it is preferable that the temperature inside the housing 25 can be rapidly increased during the time when the voltage value of the fuel cells 27 is controlled so as to be greater than the voltage value (½ OCV) for generating the maximum output in power generation of the fuel cells 27.

Here, it is preferable that the controller 14 controls the raw fuel supplying means 2 such that the first minimum flow rate value of fuel gas supplied to the fuel cells 27 during the time the power conditioner 12 is controlled such that the voltage value of the fuel cells 27 is greater than the voltage value for generating the maximum output in power generation of the fuel cells 27 (½ OCV), is greater than the second minimum flow rate value of fuel gas supplied to the fuel cells 27 during the time no such control is performed (i.e., the minimum flow rate value when the temperature inside the housing 25 (module 24) is at or higher than the aforementioned specific temperature). Specifically, it is preferable that the raw fuel supplying means 2 is controlled such that the first minimum flow rate value of fuel gas supplied to the fuel cells 27 during the time the power conditioner 12 is controlled such that the voltage value of the fuel cells 27 is greater than the voltage value for generating the maximum output in power generation of the fuel cells 27 (½ OCV), is about 1.2 to 2 times greater than the second minimum flow rate value of fuel gas supplied to the fuel cells 27 during the time no such control is performed.

Thereby, the amount of excessive fuel gas which has not been used for power generation of the fuel cells 27 is increased, and the calorific value of heat of combustion generated by burning the excessive fuel gas is increased, thus enabling the temperature inside the housing 25 (module 24) to be increased rapidly.

Thereby, it is possible to shorten the duration of controlling the power conditioner 12 such that the voltage value of the fuel cells 27 is greater than the voltage value for generating the maximum output in power generation of the fuel cells 27 (½ OCV), thus enabling the fuel cell device to be operated efficiently.

It is preferable that in the module 24 shown in FIG. 2, excessive fuel gas is burnt on the upper end side of the fuel cells 27, i.e., below the reformer 4. Thereby, heat of combustion generated by burning excessive fuel gas can warm the reformer 4, thus enabling the reformer 4 to efficiently perform a reforming reaction.

Also, the controller 14 may control the raw fuel supplying means 2 such that the first amount of fuel gas supplied to the fuel cells 27 during the time the power conditioner 12 is controlled such that the voltage value of the fuel cells 27 is greater than the voltage value for generating the maximum output in power generation of the fuel cells 27 (½ OCV), is greater than the second amount of fuel gas supplied to the fuel cells 27 during the time no such control is performed. For example, it is preferable that the raw fuel supplying means 2 is controlled such that the first amount of fuel gas supplied to the fuel cells 27 during the time the power conditioner 12 is controlled such that the voltage value of the fuel cells 27 is greater than the voltage value for generating the maximum output in power generation of the fuel cells 27 (½ OCV), is about 1.1 to 1.4 times greater than the second amount of fuel gas supplied to the fuel cells 27 during the time no such control is performed.

In this case also, the amount of excessive fuel gas which has not been used for power generation of the fuel cells 27 is increased, and the calorific value of heat of combustion generated by burning the excessive fuel gas is increased, thus enabling the temperature inside the housing 25 (module 24) to be increased rapidly.

Thereby, it is possible to shorten the duration of control such that the voltage value of the fuel cells 27 is greater than the voltage value for generating the maximum output in power generation of the fuel cells 27 (½ OCV), thus enabling the fuel cell device to be operated efficiently.

The controller 14 may control such that the fuel utilization (Uf) in the fuel cells 27 is reduced, and thereby the amount of excessive fuel gas is increased, thus performing control to increase the amount of excessive fuel gas.

Whether or not to employ the fuel cell device of the invention can be determined by detecting the amount of fuel gas supplied to the fuel cells 27, the amount of electric current supplied to the external load, and the voltage value of the cell stack 1 (fuel cells 27), and investigating the correlation thereamong.

Meanwhile, while controlling the power conditioner 12 such that the voltage value of the fuel cells 27 is greater than the voltage value for generating the maximum output in power generation of the fuel cells 27 (½ OCV) can suppress deterioration of the fuel cells 27, the maximum output of the cell stack 1 (fuel cells 27) cannot be obtained during this period, and thus the operating efficiency of the fuel cell device is reduced.

Therefore, it is preferable that when, after the power conditioner 12 is controlled such that the voltage value of the fuel cells 27 is greater than the voltage value for generating the maximum output in power generation of the fuel cells 27 (½ OCV), a specific state is reached, the voltage value of the fuel cells 27 is controlled so as to reach the voltage value for generating the maximum output in power generation of the fuel cells 27 (½ OCV). In this case, the voltage value may be controlled such that the maximum output in power generation of the fuel cells 27 can be generated in response to the requirement by the external load. Therefore, for example, the power conditioner 12 may be controlled such that the voltage value (lower limit voltage value) in power generation of the fuel cells 27 is the voltage value of the fuel cells 27 that can reach the voltage value (½ OCV) for generating the maximum output.

Here, the aforementioned specific state can be defined as, for example, the state attained after a specific period of time since the voltage value of the fuel cells 27 is controlled so as to be greater than the voltage value for generating the maximum output in power generation of the fuel cells 27 (½ OCV). Specifically, it can be defined as the state attained 0.5 to 2 hours after the voltage value of the fuel cells 27 is controlled so as to be greater than the voltage value for generating the maximum output in power generation of the fuel cells 27 (½ OCV).

After a lapse of the specific period of time after the voltage value of the fuel cells 27 is controlled so as to be greater than the voltage value for generating the maximum output in power generation of the fuel cells 27 (½ OCV), even if the temperature inside the module 24 (housing 25) is not at or higher than a specific temperature, the temperature of each fuel cell 27 constituting the cell stack 1 is nearly uniform or uniform (in other words, the temperatures of the fuel cells 27 are substantially uniform) because power generation is continuously performed during that period. Since the temperature of each fuel cell 27 is nearly uniform, concentration of electric current on some of the fuel cells 27 can be suppressed, thus enabling fuel cell deterioration to be suppressed. In addition, an increase of electric resistance in a certain portion of the fuel cells 27 can be suppressed, thus enabling deterioration of a certain portion of the fuel cells 27 to be suppressed.

Therefore, after a specific period of time since the voltage value of the fuel cells 27 is controlled so as to be greater than the voltage value for generating the maximum output in power generation of the fuel cells 27 (½ OCV), the controller 14 controls the power conditioner 12 such that the voltage value of the fuel cells 27 reaches the voltage value (½ OCV) for generating the maximum output in power generation of the fuel cells 27, thus enabling the output of the fuel cells 27 to be increased to their fullest extent, and enabling the fuel cell device to be operated efficiently.

Moreover, in the fuel cell device provided with the temperature sensor 22, the aforementioned specific state can be defined as, for example, the state attained when the temperature inside the housing 25 (module 24) measured by the temperature sensor 22 reaches the aforementioned specific temperature or higher. In this case, since the temperature inside the housing 25 (module 24) reaches the aforementioned specific temperature or higher, the temperature of the fuel cells 27 (cell stack 1) is also increased. Thereby, a non-uniform flow of electric current in the fuel cells 27 can be suppressed, concentration of electric current on some of the fuel cells 27 can be suppressed, and deterioration of the fuel cells 27 can be suppressed.

When this state is attained, controlling the power conditioner 12 by the controller 14 such that the voltage value of the fuel cells 27 reaches the voltage value for generating the maximum output in power generation of the fuel cells 27 (½ OCV) enables the output of the fuel cells 27 to be increased to their fullest extent and the fuel cell device to be operated efficiently.

Meanwhile, as with the module 24 shown in FIG. 2, in a module in which the reformer 4 composed of the evaporating portion 28 and the reforming portion 29 provided with a reforming catalyst is disposed above the cell stack 1 (fuel cells 27), the reformer 4 being heated by heat of combustion generated by burning excessive fuel gas which has not been used for power generation of the fuel cells 27 on the upper end side of the fuel cells 27 (the side on which fuel gas is discharged), the reforming catalyst is likely to deteriorate when the temperature of the reformer 4 is at or higher than a specific temperature.

Therefore, when the reformer temperature sensor 23 for measuring the temperature inside the reformer 4 is provided and the temperature of the reformer 4 measured by the reformer temperature sensor 23 is at or higher than a specific temperature, reducing the amount of excessive fuel gas burnt on the upper end side of the fuel cells 27 (reducing the calorific value of heat of combustion) enables an increase in the temperature of the reformer 4 to be suppressed or the temperature of the reformer 4 to be reduced, and enables catalyst deterioration to be suppressed.

Here, in the module 24 including, inside the housing 25, the reformer 4 comprising a reforming catalyst which is configured to generate fuel gas that is supplied to the fuel cells 27, and the reformer temperature sensor 23 for measuring the temperature of the reformer 4, the reformer 4 being heated by heat of combustion generated by burning excessive fuel gas which has not been used for power generation of the fuel cells 27 on the upper end side of the fuel cells 27 (the side on which fuel gas is discharged), controlling the power conditioner 12 by the controller 14 such that, when the temperature of the reformer 4 measured by the reformer temperature sensor 23 is at or higher than a specific temperature, the voltage value of the fuel cells 27 reaches the voltage value for generating the maximum output in power generation of the fuel cells 27 enables the amount of power generated in the fuel cells 27 to be increased. An increase in the amount of power generated in the fuel cells 27 increases the amount of fuel gas used for power generation of the fuel cells 27 out of the fuel gas supplied to the fuel cells 27. In other words, the amount of excessive fuel gas is reduced. Thereby, the amount of excessive fuel gas burnt on the upper end side of the fuel cells 27 is reduced, thus enabling an increase in the temperature of the reformer 4 to be suppressed or the temperature of the reformer 4 to be reduced, and enabling catalyst deterioration to be suppressed.

In addition, controlling the power conditioner 12 such that the voltage value of the fuel cells 27 reaches the voltage value for generating the maximum output in power generation of the fuel cells 27 enables the output of the fuel cells 27 to be increased to their fullest extent, thus enabling the fuel cell device to be efficiently operated.

A generally known reforming catalyst can be suitably used as the reforming catalyst for the reforming reaction performed in the reforming portion 29 and, for example, the reforming catalyst in which a noble metal such as Ru or Pt or a base metal such as Ni or Fe is borne on a porous carrier such as γ-alumina, α-alumina, or cordierite is usable.

The controller 14 controls the power conditioner 12 such that, when the temperature of the reformer 4 measured by the reformer temperature sensor 23 is at or higher than a specific temperature, the voltage value of the fuel cells 27 reaches the voltage value for generating the maximum output in power generation of the fuel cells 27. In regard to the temperature of the reformer 4, this specific temperature can be suitably set according to the above-described reforming catalyst, and it can be, for example, 800° C. or higher.

The invention was described in detail above, but the invention is not limited to the foregoing embodiments, and various changes, modifications, and the like can be made without departing from the scope of the invention.

For example, the fuel cell 27 may be hollow and flat plate-shaped having a gas passage inside of which oxygen-containing gas travels in a longitudinal direction, and in addition, a flat plate-shaped or cylindrical fuel cell may be used.

REFERENCE SIGNS LIST

1: Fuel cell stack
2: Raw fuel supplying means
4: Reformer
12: Power conditioner
14: Controller
22: Temperature sensor
23: Reformer temperature sensor

The invention claimed is:
1. A method for use in a fuel cell device that comprises a fuel cell module including a housing and a fuel cell stack that comprises a plurality of fuel cells, the fuel cell stack being inside the housing, the method comprising:
supplying, by a power conditioner, electric current generated by the fuel cell stack to an external load; and
controlling, by a controller, the power conditioner such that, at a time the fuel cell device starts power generation, a voltage value of the fuel cells is greater than a voltage value for generating a maximum output in power generation of the fuel cells,
reforming, by a reformer comprising a reforming catalyst, raw fuel and generating fuel gas that is supplied to the fuel cells;
supplying the raw fuel to the reformer;

supplying the fuel gas to the fuel cells at a first minimum flow amount, during a time the power conditioner is controlled such that the voltage value of the fuel cells is greater than the voltage value for generating the maximum output in power generation of the fuel cells;

supplying the fuel gas to the fuel cells at a second minimum flow amount, during a time period the power conditioner is not controlled such that the voltage value of the fuel cells is greater than the voltage value for generating the maximum output in power generation of the fuel cells;

heating the reformer by burning excessive fuel gas which has not been used for power generation of the fuel cells, and controlling, by the controller, the raw fuel supplying such that a value of the first minimum flow amount is greater than a value of the second minimum flow amount.

2. The method according to claim 1, further comprising:
supplying a first amount of fuel gas to the fuel cells, during the time the power conditioner is controlled such that the voltage value of the fuel cells is greater than the voltage value for generating the maximum output in power generation of the fuel cells;

supplying a second amount of fuel gas to the fuel cells, during the time period the power conditioner is not controlled such that the voltage value of the fuel cells is greater than the voltage value for generating the maximum output in power generation of the fuel cells; and controlling, by the controller, the raw fuel supplying such that the first amount is greater than the second amount.

3. The method according to claim 1, wherein controlling the power conditioner by the controller is performed such that, after a specific period of time, since the voltage value of the fuel cells is controlled so as to be greater than the voltage value for generating the maximum output in power generation of the fuel cells, the voltage value of the fuel cells reaches the voltage value for generating the maximum output in power generation of the fuel cells.

4. The method according to claim 1, further comprising measuring a temperature inside the housing by a temperature sensor,
wherein the controlling the power conditioner by the controller is performed such that, when the temperature inside the housing measured by the temperature sensor is at or higher than a specific temperature, the voltage value of the fuel cells reaches the voltage value for generating the maximum output in power generation of the fuel cells.

5. The method according to claim 1, further comprising:
measuring, by a reformer temperature sensor, a temperature of the reformer, and
controlling the power conditioner by the controller such that, when the temperature of the reformer measured by the reformer temperature sensor is at or higher than a specific temperature, the voltage value of the fuel cells reaches the voltage value for generating the maximum output in power generation of the fuel cells.

6. A method for use in a fuel cell device that comprises a fuel cell module including a housing and a fuel cell stack that comprises a plurality of fuel cells, the fuel cell stack being inside the housing, the method comprising:
measuring, by a temperature sensor, a temperature inside the housing;
supplying, by a power conditioner, electric current generated by the fuel cell stack to an external load;
controlling, by a controller, the power conditioner such that, when the temperature inside the housing measured by the temperature sensor is less than a first specific temperature, a voltage value of the fuel cells is greater than a voltage value for generating a maximum output in power generation of the fuel cells;

reforming, by a reformer comprising a reforming catalyst, raw fuel and generating fuel gas that is supplied to the fuel cells;

supplying the raw fuel to the reformer;

supplying the fuel gas to the fuel cells at a first minimum flow amount, during a time the power conditioner is controlled such that the voltage value of the fuel cells is greater than the voltage value for generating the maximum output in power generation of the fuel cell;

supplying the fuel gas to the fuel cells at a second minimum flow amount, during a time period the power conditioner is not controlled such that the voltage value of the fuel cells is greater than the voltage value for generating the maximum output in power generation of the fuel cells;

heating the reformer by burning excessive fuel gas which has not been used for power generation of the fuel cells, and controlling, by the controller, the raw fuel supplying such that a value of the first minimum flow amount is greater than a value of the second minimum flow amount.

7. The method according to claim 6, further comprising:
supplying a first amount of fuel gas to the fuel cells, during the time the power conditioner is controlled such that the voltage value of the fuel cells is greater than the voltage value for generating the maximum output in power generation of the fuel cells;

supplying a second amount of fuel gas to the fuel cells, during the time period the power conditioner is not controlled such that the voltage value of the fuel cells is greater than the voltage value for generating the maximum output in power generation of the fuel cells; and controlling, by the controller, the raw fuel supplying such that the first amount is greater than the second amount.

8. The method according to claim 6, wherein the controlling the power conditioner by the controller is performed such that, after a specific period of time since the voltage value of the fuel cells is controlled so as to be greater than the voltage value for generating the maximum output in power generation of the fuel cells, the voltage value of the fuel cells reaches the voltage value for generating the maximum output in power generation of the fuel cells.

9. The method according to claim 6, wherein the controlling the power conditioner by the controller is performed such that, when the temperature inside the housing measured by the temperature sensor is at or higher than the first specific temperature, the voltage value of the fuel cells reaches the voltage value for generating the maximum output in power generation of the fuel cells.

10. The method according to claim 6, further comprising:
measuring, by a reformer temperature sensor, a temperature of the reformer, and
controlling the power conditioner, by the controller such that, when the temperature of the reformer measured by the reformer temperature sensor is at or higher than a second specific temperature, the voltage value of the fuel cells reaches the voltage value for generating the maximum output in power generation of the fuel cells.

* * * * *